(12) United States Patent
Olivier

(10) Patent No.: US 12,313,110 B2
(45) Date of Patent: May 27, 2025

(54) FASTENER

(71) Applicant: Lisi Automotive Rapid, Puiseux-Pontoise (FR)

(72) Inventor: William Olivier, Courbevoie (FR)

(73) Assignee: LISI AUTOMOTIVE RAPID (FR)

(*) Notice: Subject to any disclaimer, the term of this patent is extended or adjusted under 35 U.S.C. 154(b) by 0 days.

(21) Appl. No.: 18/622,221

(22) Filed: Mar. 29, 2024

(65) Prior Publication Data
US 2024/0328451 A1 Oct. 3, 2024

(51) Int. Cl.
*F16B 37/08* (2006.01)

(52) U.S. Cl.
CPC ................... *F16B 37/0857* (2013.01)

(58) Field of Classification Search
CPC ...... F16B 2/245; F16B 21/065; F16B 21/075; F16B 5/0266
See application file for complete search history.

(56) References Cited

U.S. PATENT DOCUMENTS

| 11,878,379 B2 * | 1/2024 | Limpert | B60R 13/0206 |
| 2021/0324892 A1 * | 10/2021 | Steimer | F16B 21/065 |
| 2022/0379415 A1 * | 12/2022 | Limpert | F16B 37/0864 |

FOREIGN PATENT DOCUMENTS

| FR | 3091909 A1 * | 7/2020 | ............. F16B 21/08 |
| FR | 3091909 | 7/2024 | |

OTHER PUBLICATIONS

Translation of FR-3091909-A1 (Year: 2020).*

* cited by examiner

*Primary Examiner* — Jacob J Cigna

(57) ABSTRACT

The invention relates mainly to a fastening system (1) comprising a fastening part (2) and an arming part (11), the fastening system (1) can be actuated between a fitting position around the stud (34) wherein the arming part (11) holds four tabs (7, 9) of a fastening part (2) in the stressed position thereof, and a position of tensioned fastening to the stud (34) wherein the arming part (11) is connected to the fastening part (2) when the four tabs (7, 9) are in the free position.

15 Claims, 3 Drawing Sheets

FASTENER

TECHNICAL FIELD

The invention relates to the field of fastenings, and relates more particularly to a system for fastening to a threaded stud, particularly suitable for mounting a panel on a vehicle body of a motor car.

BACKGROUND

In a known manner, the fastening of a panel to motor car frame is achieved by fitting the panel against the frame, the frame comprising protruding threaded studs which pass through holes provided in the panel, then by screwing bolts for fastening the panel against the frame so that no mechanical play is left.

Such screwed-in fastening are often tedious for an operator, as well as taking a long time.

One-part clips are known which can be clipped onto a threaded stud. Fastening by rotating a bolt is thus avoided. However, the clips are suitable for a particular type of threaded stud, and the operator has to exert a significant force on the clip to fasten and lock the clip around the stud.

Publication FR3091909 discloses a part for fastening to a threaded stud protruding from a base comprising a fastening part provided with a plurality of curved claws the ends of which are intended to be inserted into the thread of a stud, and a trim part intended to cover the fastening part by exerting a force on the claws: the force deforms the claws which will consolidate the lodging of the ends of the claws in the thread and generate a tensioning force against the base.

However, the tensioning force generated by the fastening part against the base after attachment depends greatly on the installation force provided by the operator.

According to one embodiment, a system for fastening to a threaded stud protruding from a base, the installation of which is carried out in an ergonomic and reproducible way.

SUMMARY

To this end, the invention addresses a system for fastening to a threaded stud protruding from a base, e.g. a motor vehicle frame, comprising:
a) a fastening part comprising:
  i) a base with a through hole intended for receiving the threaded stud,
  ii) two opposing claws each having a free end for cooperating with the thread of the stud, the free ends of the two claws facing each other on either side of the hole, and
  iii) two tension tabs protruding from two opposite second edges of the base distinct from the first edges, the tension tabs being elastically deformable between a free position wherein the base is not flat and a stressed position wherein the base is flat;
b) an arming part of the fastening part comprising:
  i) a hole for receiving the threaded stud, and
  ii) means of locking the tensioning tabs of the fastening part in the stressed position;
the fastening system can be actuated between a fitting position around the stud wherein the arming part holds the tabs of the fastening part in the stressed position thereof, and a position of tensioned fastening to the stud.

The fastening system may also include the following optional features considered alone or in all possible technical combinations:

The fastening part comprises two lodging tabs protruding from two first opposite edges of the base and mechanically connected to the two respective cooperating claws, the lodging tabs being elastically deformable between a free position for lodging the free ends of the claws into the thread of the stud and a stressed position for moving said free ends of the claws away from the thread of the stud.

The arming part comprises means of locking the lodging tabs of the fastening part in the stressed position.

The fastening system can be actuated between the position of fitting around the stud wherein the arming part holds the four tabs of the fastening part in the stressed position thereof, and the position of fastening under tension to the stud.

The arming part comprises means of connection to the fastening part when the lodging tabs and the tensioning tabs of the fastening part are in the free position, the fastening system being in the position thereof of fastening under tension to the stud.

Each lodging tab of the fastening part comprises a window for cooperating with the arming part by the means of connection thereof.

The window is delimited by an upper portion for cooperating with the arming part by the means thereof for locking the lodging tab in question in the stressed position.

The window is delimited by an opposite lower portion from which the claw in question protrudes.

The free end of each claw is concave.

Each claw comprises a flat main body and in that the free end of each claw is inclined with respect to a plane of extension of the body of the claw, the directions of inclination of the free ends of the two respective claws being opposite.

Each tensioning tab of the fastening part comprises a main body for deformation of the base and a free end portion for cooperating with the fastening part:
  a) by the means of locking provided on the arming part when the tension tab is in the stressed position, and
  b) by the means of connection provided on the arming part when the tension tab is in the free position thereof.

The base is curved when the tension tabs are in the free position thereof.

The means of connection and the means of locking the lodging tabs are formed by two opposing protruding stops each comprising:
  a) a retaining surface of the respective lodging tab in question in the free position thereof forming a means of connection, and
  b) a locking shoulder provided on an inclined surface for receiving the upper portion of the respective lodging tab in question in the stressed position thereof.

The means of connection and the means of locking the tension tabs are formed by two opposed hollowed-out members each comprising:
  a) a housing for locking the free end portion of the tension tab in the stressed position thereof, and
  b) a grooved portion forming means of connection and comprising a groove for housing the main body of the tension tab and two retaining edges of the free end portion of the tension tab arranged on both sides of the groove when said tension tab is in the free position thereof.

The locking housing provided in each hollowed-out member of the arming part is delimited by an inclined surface for receiving the free end portion of the tension tab.

The fastening system comprises an element for connecting to a panel intended to be fastened to the base, the element comprising a main body, lugs for fastening to the panel and a housing for the fastening and arming parts connected to each other.

The fastening part comprises legs for connecting to the connecting element, at least one end part of each connecting leg, or connection legs, facing a lower face of the main body.

The invention further relates to a method of installing a panel against a base with at least one fastening system as described hereinabove to a threaded stud protruding from said base, the method comprising the successive steps of:
a) Fitting the panel against the base, the stud extending through the panel through a hole made in said panel;
b) Fitting the fastening system around the stud, the tabs of the fastening part being in the stressed position and the base being flat;
c) Translation of the fastening system into the stressed position thereof along the threaded stud until the base is brought into contact with the panel;
d) Moving in translation the arming part towards the panel with respect to the fastening part in contact abutment to the panel, the tabs being in the stressed position thereof;
e) Concomitant release of the tabs and actuation of the fastening part toward the free position thereof of fastening around the stud, during which the free ends of the claws engage into the thread of the stud and during which the base moves from the flat position thereof to the non-flat position thereof by exerting a stress against the panel directed perpendicular to said base in order to remove any mechanical play between the fastening part, the panel and the base.

BRIEF DESCRIPTION OF FIGURES

Other features and advantages of the invention will be clear from the description thereof which is given hereinafter as an example, but not limited to, with reference to the enclosed figures.

DETAILED DESCRIPTION

Figure 1:
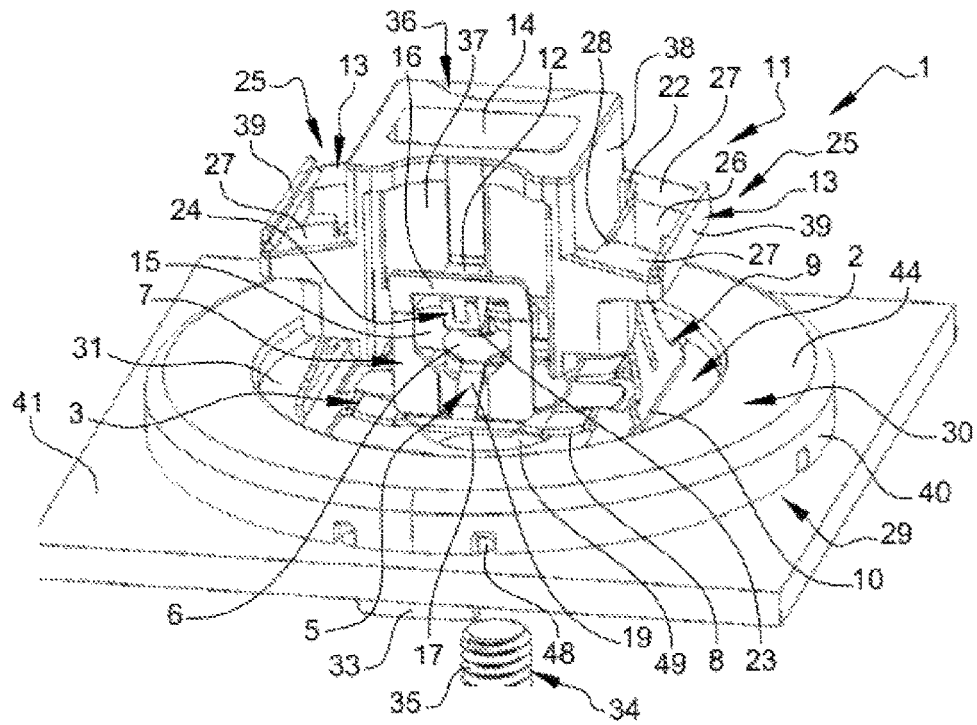
FIG. 1 is a perspective view of the fastener according to one embodiment, the system being armed and pre-assembled on a panel.

It is first specified that in the figures, the same references identify the same elements regardless of the figure in which same appear and regardless of the form of representation of said elements. Similarly, if elements are not specifically referenced in one of the figures, the references thereof can easily be found by referring to another figure.

It is also specified that the figures essentially represent one embodiment of the subject matter of the invention but that there may be other embodiments that meet the definition of the invention.

According to one embodiment, a fastening system 1 by snap-fastening to a threaded stud 34, and finds its application in the field of fastening industrial parts, and in particular in the field of fastening accessories to a frame 42 or the vehicle body of a motor car.

With reference to FIGS. 1 to 5, the fastening system 1 of the invention comprises a fastening part 2 for fastening to the threaded stud 34 and an arming part 11 for said fastening part 2.

The fastening part 2, may be made of a metallic material, typically made of steel or any suitable material. The part is particularly visible in the unstressed free position in FIGS. 2 and 4, and in the stressed armed position in FIG. 5.

The fastening part 2 extends along a longitudinal axis and comprises a base 3 of generally rectangular shape, the base 3 comprising an inner face and an opposite outer face. The base 3 comprises at the center thereof a frustoconical central portion 45 protruding from the inner face of the base 3 and which comprises at the center thereof a through cylindrical hole 4 through which the threaded stud 34 is provided to be housed. The diameter of the through hole 4 is greater than the diameter of the threaded stud 34.

The fastening part 2 further comprises two opposite lodging tabs 7 protruding from two opposite longitudinal edges 8 of the inner face of the base 3. The lodging tabs 7 are elastically deformable and can be actuated between a free lodging position and a stressed or armed position. The switch from the free position to the stressed position take place by spreading apart the distal ends of said lodging tabs 7.

Each lodging tab 7 comprises a window 15 delimited by a lower portion 17 rigidly attached to the considered edge 8 of the base 3, and an opposite upper portion 16. The upper portion 16 also extends in a plane secant with respect to a plane of extension of the rest of the lodging tab 7.

The fastening part 2 further comprises two opposite claws 5 each comprising a flat main body 19 which extends from the lower portion 17 of the relevant lodging tab 7, and a distal free end 6 for cooperating with the thread 35 of the stud 34. The free ends 6 of the two respective claws 5 face each other, on both sides of the through hole 4. In order to provide a greater surface area of cooperation of the free end 6 of each claw 5 with the thread 35 of the stud 34, said free end 6 of each claw 5 has a concave shape. In other words, the concave shape of the free end 6 of each claw 5 makes it possible to provide a linear contact between said free end 6 and the threaded stud 34.

Moreover, the free end 6 of each claw 5 has the same orientation as that of the thread 35 of the stud 34. For example, if the stud has a fir-tree thread, the main body 19 and the free end 6 of each claw 5 extend in the same plane. If the stud 34 has a triangular thread 35, as shown in FIG. 1, then the free end 6 of the claw 5 is inclined with respect to a plane of extension of the claw 5, so as to make possible an insertion of the entire free end 6 of the claw 5 into the thread 35 of the stud 34. In the case of a fastening part 2 suitable for a triangular thread 35, the directions of inclination of the free ends 6 of the two respective claws 5 are opposite.

The claws 5 are mechanically connected to the lodging tabs 7. Thereby, when the lodging tabs 7 are in the free position thereof, the claws 5 are configured to clamp in the thread 35 of the stud 34. On the other hand, when the lodging tabs 7 are in the stressed position thereof, the claws 5 are in a position of release of the free ends 6 thereof from the thread 35 of the stud 34. Indeed, the switch from the free position to the stressed position of the lodging tabs 7 makes the distal free ends 6 of the facing claws 5 move apart from each other.

Figure 5:
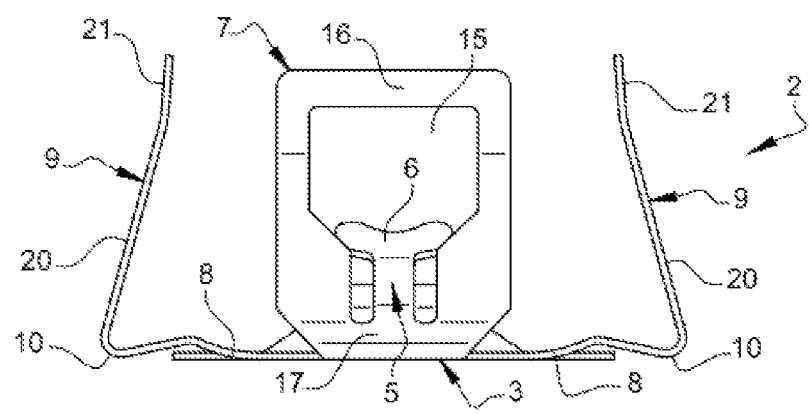
FIG. 5 is a side view of the fastening part shown in FIG. 3 in a stressed position.

The fastening part 2 also comprises two opposite tension tabs 9, protruding from two opposite transverse edges 10 of the inner face of the base 3. The tension tabs 9 are elastically deformable by bringing the distal free ends 21 of said tension tabs 9 closer together. The tension tabs can thereby be actuated between a free position wherein the base 3 of the fastening part 2 is not flat and a stressed—or armed—position wherein the base 3 is flat (FIG. 5).

More particularly, when the tension tabs 9 are in the free position thereof, the opposite outer face of the base 3 of the fastening part 2 has a concave curved profile. Alternatively, when the tension tabs 9 are in the free position thereof, the outer face of the base 3 has a profile in the form of a broken line (see FIG. 4), with a flat central zone and two inclined end zones, the angle between the central zone and the end zone considered being less than 180° at the outer face of the base 3 of the fastening part 2.

In order to adjust and limit the force needed to move the tension tabs 9 from the free position thereof to the armed position thereof, U-shaped through grooves 46 may be provided in the base 3 of the fastening part 2.

Each tension tab 9 further has the shape of a T and comprises a main body 20 protruding from the base 3 of the fastening part 2 and a free end portion 21 forming the distal end which extends perpendicularly to said main body 20, i.e. parallel to the longitudinal axis. Moreover, the free end portion 21 extends in a plane secant with respect to a plane of extension of the rest of the tension tab 9.

Finally, the fastening part 2 comprises four transverse connecting legs 32 protruding from the tops of the base 3, perpendicularly to the opposite longitudinal edges 8 of said base 3.

The arming part 11, preferentially made of plastic or composite material and assembled to the fastening part, will now be described.

The arming part 11 is at least partly housed in a space delimited by the four tabs 7, 9 of the fastening part 2, and extends along a second longitudinal axis which coincides with the longitudinal axis of the fastening part 2.

The arming part 11 comprises a main body 36 of rectangular cross-section wherein a through hole 14 is provided for receiving the threaded stud 34. The hole 14 shown in FIGS. 1 and 2 has a rectangular cross-section, but any shape of cross-section can be envisaged without departing from the scope of the invention provided that the hole 14 can house the threaded stud 34. The two holes 4, 14 of the fastening part 2 and of the arming part 11 extend along the e same axis perpendicular to the longitudinal axis and to a transverse axis of the fastening system, which axis will be referred to hereinafter as the vertical axis.

The main body 36 of the arming part 11 comprises an upper face, a lower face opposite the base of the fastening part, and four lateral faces 37, 38, including two longitudinal lateral faces 37 and two transverse lateral faces 38.

The arming part 11 comprises means of locking the lodging tabs 7 in the stressed position 23, means of locking the tension tabs 9 in the stressed position 22, and means of connection 12, 13 to the fastening part 2 when the lodging tab 7 and the tension tab 9 are in the free position thereof.

Figure 2:
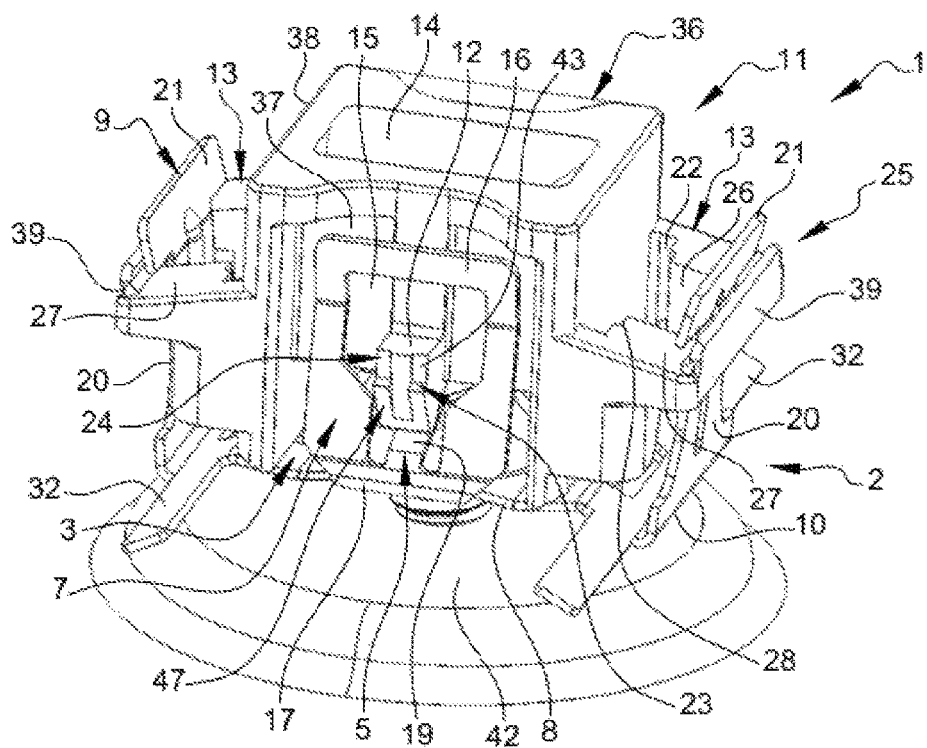
FIG. 2 is a perspective view of the fastener according to the embodiment, the system being free.
Figure 3:
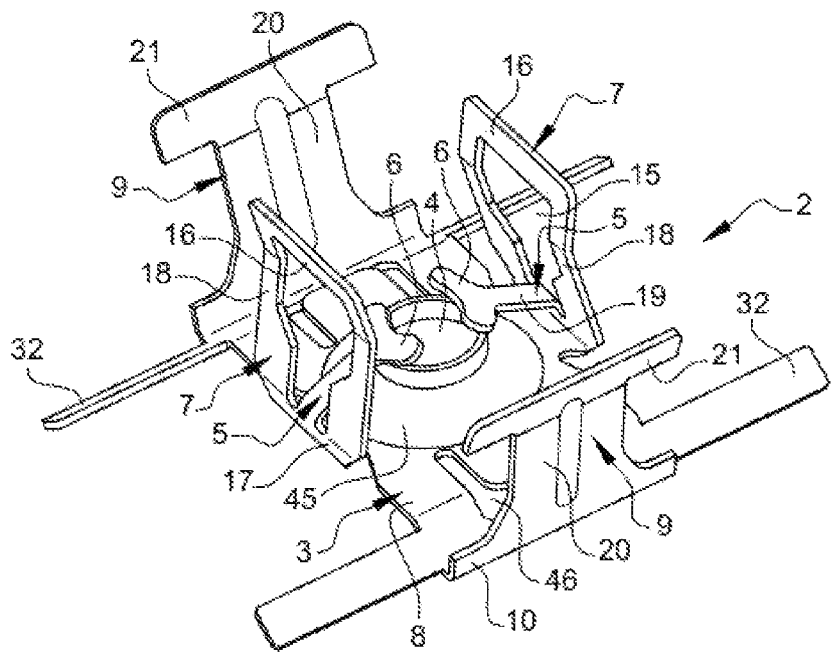
FIG. 3 is a perspective view of a fastening part of the fastening system of FIG. 1, the part being in the unstressed free position.
Figure 4:
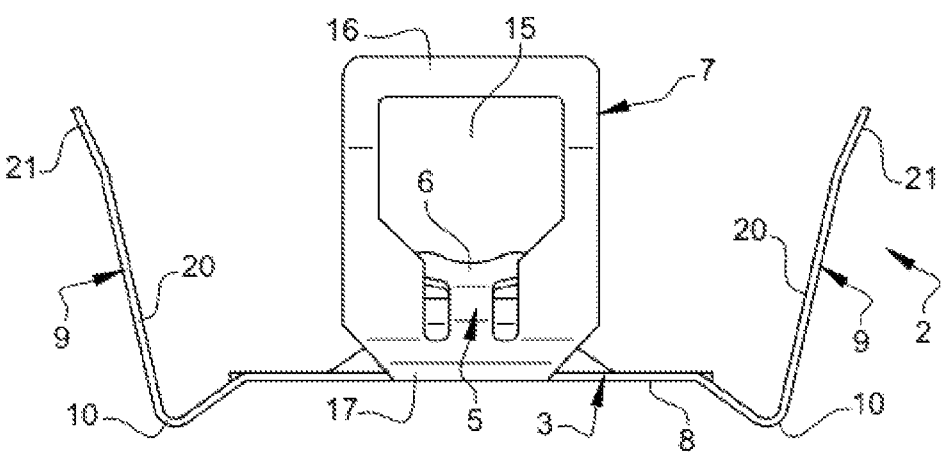
FIG. 4 is a side view of the fastening part shown in FIG. 3 in a free position.

With reference to FIG. 2, the structure of the arming part 11 forming the means of connection 12, 13 and means of locking 22, 23 will be described.

The arming part 11 comprises two opposite hollowed-out members 25 rigidly attached to the two opposite transverse lateral walls 38, respectively, of the main body 36 of the arming part 11. Each hollowed-out member 25 comprises a grooved portion 13—which forms the means of connection of the fastening part 2 when the tension tab 9 and the lodging tab 7 are in the free position—including a longitudinal groove 26 for housing the main body 20 of the tab 9 and two longitudinal retaining edges 27 of the free end portion 21 of the tension tab 9, the longitudinal retaining edges 27 extending on both sides of the housing groove 26.

The longitudinal retaining edges 27 protrude from the transverse lateral wall 38 in question of the main body 36 of the arming part 11. The width of the housing groove 26 is greater than or equal to the width of the main body 20 of the tension tab 9 considered, and less than the width (i.e. a dimension perpendicular to the longitudinal axis) of the free end portion 21 of said tension tab 9. Furthermore, the longitudinal retaining edges 27 extend obliquely with respect to the transverse lateral face 38 in question of the main body 36 of the arming part 11 and toward the lower face of said main body 36. Obliquely means a direction of extension of the retaining edges 27 which is neither parallel nor perpendicular to the transverse lateral face 38 considered. Finally, each grooved portion 13 comprises a transverse edge 39 forming the distal end of the hollowed-out member 25.

Thereby, each housing groove 26 is delimited by the transverse lateral wall 38 in question of the main body 36 of the arming part 11, by the two longitudinal retaining edges 27 and by the distal end transverse edge 39.

Each hollowed-out member 25 further comprises a housing 22 for the free end portion 21 of the tension tab 9—which forms the means of locking the tension tab 9 in the stressed position—which extends between the transverse lateral wall 38 in question and the housing groove 26 of the grooved portion 13. The locking housing 22 of the free end portion 21 of the tension tab 9 extends along a transverse direction and has a width greater than or equal to the transverse dimension of the free end portion 21 of the tension tab 9. Furthermore, each locking housing 22 is delimited by two inclined surfaces 28 for receiving the free end portion 21 of the tension tab 9, provided in the walls of the respective longitudinal retaining edges 27 on both sides of the housing groove 26. Thereby, the surface contact between the free end 21 of the tension tab 9 in question and the inclined reception surfaces 28 is maximized, which improves the locking of the tension tab 9 in the stressed position. Moreover, the inclined surfaces 28 each extend up to two respective shoulders (not shown) provided in the walls of the respective longitudinal retaining edges 27 on both sides of the housing groove 26. The shoulders serve to retain the armed fastening part (2) in the arming part (11).

The arming part 11 further comprises two opposite stops 24 which protrude from the opposite longitudinal lateral faces 37 of the main body 36 of said arming part 11. The stops 24 form lugs for locking the lodging tabs 7 in the stressed position thereof.

Each stop 24 comprises an upper connecting surface 12 which extends perpendicularly from the longitudinal lateral face 37 considered of the main body 36 of the arming part 11. The upper surface forms the means of connection of the fastening part 2 when the tension tab 9 and the lodging tab 7 are in the free position.

The stop 24 further comprises a locking surface 47 inclined toward the lower face of the main body 36 of the arming part 11 and which extends from the upper face 12 of the stop 24, so that the stop has a triangular profile.

A locking shoulder 23 is formed in the inclined surface 47 and which forms the means of locking the lodging tab 7 considered in the stressed position thereof. The lateral surface 43 of the shoulder 23 is parallel to the upper portion 16 of the lodging tab in question 7 in the stressed position, so that the surface contact between the upper portion 16 of the lodging tab in question 7 and the lateral surface 43 of the shoulder 23 is maximized, which improves the locking in the stressed position of the lodging tab 7.

The fastening to a threaded stud 34 of the fastening system 1 is described.

Before use, the fastening system 1 is armed, i.e. the lodging tab 7 and the tension tab 8 are in the armed position thereof, in other words under stress, as shown in FIG. 1.

The two lodging tabs 7 are held under stress by the stops 24—or locking noses—of the arming part 11: the upper cooperation portion 16 of each lodging tab 7 cooperates with the shoulder 23 of the stop 24 in question of the arming part 11. The effect of the above is to spread apart the lodging tabs 7 along a transverse direction, and at the same time to spread apart the distal free ends 6 of the two claws 5 so that same are disengaged from the thread 35 of the stud 34. In this way, the fastening part 2, when the lodging tabs 7 are armed, can slide without resistance along the threaded stud 34.

The two tension tabs 9 are also held under stress by being housed in the locking housings 22 of the hollowed-out members 25. Under such conditions, the arming part 11 tends to bring the free ends 21 of the tension tabs 9 closer together, which has the effect of deforming the base 3 of the fastening part 2, and more precisely of flattening said base 3.

When an operator fits the fastening system 1 around the stud 34, the operator takes the arming part 11 and inserts the stud 34 into the two through-holes 4, 14 of the fastening part 2 and of the arming part 11, respectively.

Advantageously, the arming part 11 comprises two opposite flexible tabs (not shown) which protrude from the inner face of the hole 14 of the main body 36 of said arming part 11, each extending to a distal free end, the distal ends facing each other. The distance between the two flexible tabs is less than the diameter of the stud 34, so that when the stud 34 is inserted into the holes 4, 14 of the arming system 1 in the armed position, the claws 5 of the fastening part 2 are disengaged from the thread 35 of the stud 34 but the flexible lugs of the arming part 11 are in contact abutment against the stud 34, which make the fastening system 1 hold around the stud 34. The resistance force exerted by the flexible lugs is low, i.e. less than 20 Newtons, which has the double advantage of making possible a pre-fitting of the fastening system 1 around the stud 34 before the final fastening, while allowing the operator to remove the still armed fastening system 1 from the stud 34.

To fit the fastening system 1, the operator then moves the fastening system 1 around the stud 34 until the outer face of the base 3 of the fastening part 2 comes into contact abutment with the surface from which the stud 34 protrudes, e.g. the frame 42. Alternatively, when the operation is aimed at pressing a panel 41 against the base 42, the operator moves the fastening system 1 around the stud 34 until the outer face of the base 3 of the fastening part 2 comes into contact with the panel 41.

By the pressure force exerted by the operator on the upper face of the arming part 11, the latter continues the translation movement thereof toward the frame 42 while the fastening part 2 remains immobile, the base bearing against the panel: there is thus a relative translational movement of the arming part 11 with respect to the fastening part 2. The force required to be exerted by the operator to ensure the translation of the arming part 11 with respect to the fastening part 2 is relatively small, between 30 and 50 Newtons.

Such relative movement causes, concomitantly, both the displacement of the distal end parts 21 of the tension tabs 9 out of the locking housings 22, and the disengagement of the upper portions 16 of the lodging tabs 7 out of the shoulders 23 formed in the locking stops 24 of the arming part 11.

The four tabs 7, 9 of the fastening part 2 then move concomitantly from their armed position to the free position thereof: the main body 20 of each tension tab 9 is found in the housing groove 26 of the arming part 11, while the upper portion 16 of each lodging tab 7 faces the upper connecting surface 12 of the stop 24. The switch from the stressed position to the free position of the tabs 7, 9 is sudden—a few hundredths of a second—and produces a characteristic sound perfectly recognizable by the operator fitting the fastening system 1, which tells the operator that the fastening part 2 has been actuated to the free position thereof and that same is in place around the threaded stud 34.

Furthermore, the upper part 21 of each tension tab 9 is retained in the housing groove 26 by the distal end 39 of the grooved portion 13 while the stops 24 of the arming part 11 are housed in the windows 15 of the lodging tabs 7, which ensures the connection between the fastening part 2 and the arming part 11 while ensuring the free movement of the arming part 11 with respect to the fastening part 2. The fastening system 1 is then in a position of tensioned fastening to the stud 34, as shown in FIG. 2.

Indeed, when the four tabs 7, 9 move from the armed position to the free position, the free ends 6 of the claws 5 of the fastening part 2 engage in the thread 35 of the stud 34 whereas the base 3 of the fastening part 2 resumes the non-planar free position thereof by exerting a pressing force against the frame 42 and the panel 41. Such force exerted, which is greater than or equal to 50 Newtons, serves to remove any mechanical play between the panel 41, the frame 42 and the fastening system 2. Furthermore, the force exerted by the fastening part 2 against the frame 42 and the panel 41 depends on the material of the fastening part 2 and on the shape of said fastening part 2. Thereby, if all the fastening parts 2 of a plurality of fastening systems 1 are identical, then the forces exerted by the fastening parts 2 against the panel 41 and the frame 42 from which the studs 34 protrude are all identical, which ensures a reproducible fitting of the fastening systems 1 around the studs 34.

The fastening system 1 fitted around the stud 34 is designed to resist pullout, more particularly to resist distancing force directed along the opposite direction to the force which presses the fastening part 1 against the frame 42. The pull-out strength of the fastening part 1 fastened to the threaded stud 34 is at least equal to 600 Newtons.

Advantageously, the fastening system 1 absorbs the distancing stresses by deformation of the fastening part 2. Such deformation of the fastening part 2 tends to bring the distal ends 6 of the cooperating claws 5 closer together, leading to an increase in the force of abutment of said distal ends 6 of the claws 5 against the thread 35 of the stud 34. Thereby, a force exerted on the fastening system 1 aimed at moving said fastening system 1 away from the frame 42 will tend, on the other hand, to reinforce the fastening of the fastening system 1 around the threaded stud 34, provided that the distancing force remains less than the force required for a pullout.

In any event, the fastening system 1 fitted around the stud 34 can be easily removed, in particular on a stud 34 with a triangular thread 35, since it suffices for the operator to unscrew the fastening system 1 in the usual way as for a usual nut.

Finally, in order to allow the fastening system 1 to be pre-assembled on a panel 41, said fastening system 1 comprises a connecting part 30 for connecting to said panel 41 which will now be described, mainly with reference to FIG. 1.

The connecting part 30 comprises an annular wall 44 the inner diameter of which lets through the arming part 11 and the lodging tabs 7 and the tension tabs 9 of the fastening part 2 but does not let through the connecting legs 32 which face a lower face of the annular wall 44.

The connecting part 30 further comprises a cylindrical wall 40 which protrudes from the lower face of the annular wall 44, and a plurality of deformable snap-fastening tabs 33 which extend from the free edge of the cylindrical wall 40.

The connecting part 30 serves to pre-assemble the fastening system 1 on the panel 41 by placing against the panel 41 the fastening parts 2 and the arming parts 11 assembled together, so that the holes 4, 14 of the fastening parts 2 and arming parts 11 of the fastening system 1 are facing a through-hole 49 provided in the panel 41. The connecting part 30 is then fastened to the panel 41 by snap-fastening fastening brackets such as snap-fastening tabs 33 into through recesses 48 provided for such purpose and provided in the panel 41 (FIG. 1).

According to an alternative embodiment (not shown), the connecting part 30 comprises two opposite lugs which extend from the free edge of the cylindrical wall 40 perpendicular to the latter, the lugs serving for a slideway mounting in a groove provided in the panel 41.

The assembly between the fastening part 2 and the arming part 11 is thereby retained by the connecting part 30, and the distance separating two opposite connecting legs 32 of the fastening part 2 is less than the inner diameter of the hole 31 of the connecting part 30, there is a play for moving the assembly in order to facilitate the positioning of the fastening system 1 opposite the stud 34 during the fitting.

In a particularly advantageous way, the fastening panel 41 fastens to a plurality of studs 34 protruding from a frame 42 of a vehicle, the panel 41 comprising a plurality of pre-mounted fastening systems 1. It is then possible to assemble, concomitantly, a plurality of fastening systems 1. Fastening to the studs 34 is not only easier, reproducible, but also faster.

The invention claimed is:

1. A system for fastening to a threaded stud protruding from a vehicle frame, comprising:
   a) a fastening part comprising:
   i) a base with a hole for receiving a threaded stud,
   ii) two opposite claws each comprising a free end for cooperating with the threaded stud, the free end of the two opposite claws being opposite each other on both sides of the hole,
   iii) two tension tabs protruding from two opposite second edges of the base distinct from first edges, the two tension tabs being elastically deformable between a free position wherein the base is not flat and a stressed position wherein the base is flat;
   b) an arming part of the fastening part comprising:
   i) a hole for receiving the threaded stud,
   ii) means of locking the two tension tabs of the fastening part in a stressed position; and
   the system can be actuated between a fitting position around the threaded stud wherein the arming part holds the two tension tabs of the fastening part in the stressed position thereof, and a position of tensioned fastening to the threaded stud.

2. The system according to claim 1, wherein the base is curved when the tension tabs are in the free position thereof.

3. The system according to claim 1, wherein the free end of each claw is concave.

4. The system according to claim 3, wherein each claw comprises a flat main body and in that the free end of each claw is inclined with respect to a plane of extension of the flat main body of each claw, such that a direction of inclination of the free ends of the two claws respectively being opposite.

5. The system according to claim 1, wherein the system comprises a connecting element for connecting a panel to the base, the connecting element comprising a main body, fastening brackets for fastening to the panel, and a housing for the fastening part and the arming part connected to each other.

6. The system according to claim 5, wherein the fastening part comprises connection legs for connecting to the connecting element, at least one end portion of each connecting leg being opposite a lower face of the main body.

7. The system of claim 1, wherein:
   a) The fastening part comprises two lodging tabs protruding from two first opposite edges of the base and mechanically connected to the two opposite claws respectively cooperating, the two lodging tabs being elastically deformable between a free position for lodging the free ends of the two opposite claws into a thread on the threaded stud and a stressed position for moving said free ends of the two opposite claws away from the thread on the threaded stud;
   b) The arming part comprises means of locking in the stressed position the lodging tabs of the fastening part; and
   the system can be actuated between the fitting position around the threaded stud wherein the arming part holds the lodging tabs and tension tabs of the fastening part in the stressed position thereof, and the position of tensioned fastening to the threaded stud.

8. The system according to claim 7, wherein the arming part comprises means for connection to the fastening part when the lodging tabs and the tension tabs of the fastening part are in the free position, the fastening system being in the position of tensioned fastening to the threaded stud.

9. The system according to claim 8, wherein each tension tab of the fastening part comprises a main body for deforming the base and a free end portion for cooperating with the fastening part:
   a) by the means of locking provided on the arming part when the tension tab is in the stressed position, and
   b) by the means of connection provided on the arming part when the tension tab is in the free position.

10. The system according to claim 8, wherein:
   a) the means of connection and the means of locking of the two lodging tabs are formed by two opposing protruding stops each comprising:
   i) a retaining surface of the respective lodging tab in the free position thereof forming means of connection;
   ii) a locking shoulder provided on an inclined surface for receiving an upper portion of the respective lodging tab in the stressed position;
   b) the means of connection and the means of locking the tension tabs are formed by two opposed hollowed-out members each comprising:

i) a locking housing for locking a free end portion of the tension tab in the stressed position thereof, and ii) a grooved portion forming the means of connection and comprising a housing groove for housing a main body of the tension tab and two retaining edges of the free end portion of the tension tab arranged on both sides of the grooved portion when said tension tab is in the free position.

11. The system according to claim 10, wherein the locking housing is in each hollowed-out member of the arming part, delimited by an inclined surface for receiving the free end portion of the tension tab.

12. The system according to claim 8, wherein each lodging tab of the fastening part comprises a window for cooperating with the arming part by the means for connection.

13. The system of claim 12, wherein the window is delimited by an upper portion for cooperating with the arming part by the means of locking the tension tabs, in the stressed position.

14. The system according to claim 13, wherein the window is delimited by an opposite lower portion from which each claw protrudes.

15. A method of fitting a panel against a base with at least one fastening system to a threaded stud protruding from said base, the method comprising:

fitting the panel against the base of a fastening part, the threaded stud extending through a hole in the panel, the fastening part including:

two claws opposite each other on both sides of the hole in the panel, two tension tabs protruding from two opposite second edges of the base, the tension tabs being elastically deformable between a free position wherein the base is not flat and a stressed position wherein the base is flat; and an arming part having a hole for receiving the threaded stud and a housing for locking the tension tabs;

fitting the at least one fastening system around the threaded stud, the tension tabs being in the stressed position and the base being flat;

translation of the fastening system into the stressed position thereof along the threaded stud until the base is brought into contact with the panel;

moving in translation the arming part towards the panel with respect to the fastening part in contact abutment to the panel, the tension tabs being in the stressed position thereof; and concomitant release of the tension tabs and actuation of the fastening part toward the free position thereof of fastening around the threaded stud, during which each free end of the two claws engage into a thread of the threaded stud and during which the base moves from the flat position thereof to the not flat position by exerting a stress against the panel directed perpendicular to said base.

* * * * *